United States Patent [19]
Edwards

[11] 3,895,846
[45] July 22, 1975

[54] MAGNETIC BALL RETAINING APPARATUS
[75] Inventor: William J. Edwards, Oklahoma City, Okla.
[73] Assignee: Honeywell Information Systems Inc., Oklahoma City, Okla.
[22] Filed: Sept. 5, 1974
[21] Appl. No.: 503,421

[52] U.S. Cl.............................. 308/10; 308/DIG. 11
[51] Int. Cl.².......................................... F16C 35/00
[58] Field of Search .. 335/209, 302; 308/10, 189 R, 308/201, DIG. 11

[56] References Cited
UNITED STATES PATENTS
3,011,842  12/1961  Norris.............................. 308/10 X
3,016,274  1/1962   Norris.............................. 308/10 X
3,216,349  11/1965  Kraft............................... 308/10 X Primary Examiner—G. Harris
Attorney, Agent, or Firm—Edwin H. Crabtree

[57] ABSTRACT

A magnetic ball retaining apparatus used as a pressure roller in a media transport. The apparatus includes a steel ball roller, captured magnetically inside a ring magnet. The apparatus can be used in any position. The magnetic field opposes the displacement of the ball and the ball provides the necessary force on the moving media.

2 Claims, 3 Drawing Figures

MAGNETIC BALL RETAINING APPARATUS

BACKGROUND OF THE INVENTION

This invention relates generally to improvements in media transports and more particularly, but not by way of limitation, to a ball retaining apparatus.

Prior art ball retaining devices include a ball inserted into a captor retainer. Pressure is exerted on the moving media by the weight of the ball or by a backup spring biasing the ball against the media. The ball retaining device, which relies on the weight of the ball, is effective only when used in a horizontal plane and positioned above the moving media. The ball device uses the backup spring, is subject to the failure of the biasing force of the spring over an extended period of time.

SUMMARY OF THE INVENTION

The subject invention allows the ball retaining device to be used in any position (i.e., horizontal, vertical, or any angle). The apparatus eliminates the reliance on gravity to force the ball against the media. Also, the apparatus eliminates backup springs to force the ball against the media.

The apparatus includes a steel ball roller, a magnetic ring, and retainer rings. The retainer rings are used to center the ball roller in the magnetic field inside the inner circumference of the magnetic ring. The retainer rings also prevent the dislodging of the ball roller from the magnetic field. The ball roller resists displacement, but not rotation.

The advantages and objects of the invention will become evident from the following detailed description when read in conjunction with the accompanying drawings which illustrate a preferred embodiment of the invention.

DETAILED DESCRIPTION OF THE DRAWINGS

Figure 1:
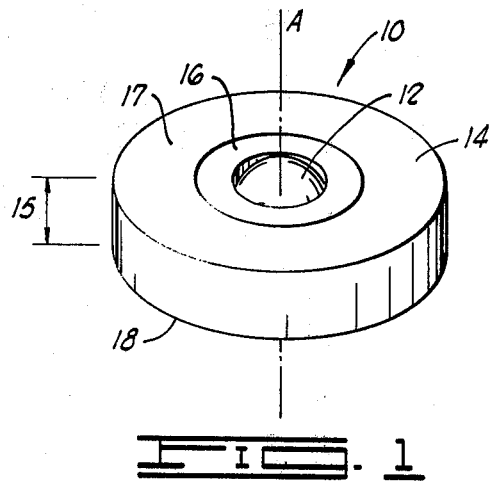
FIG. 1 is a perspective view of the magnetic ball retaining apparatus.

In FIG. 1, the magnetic ball retaining apparatus is designated by the general reference character 10. The apparatus 10 includes a ball roller 12, a ring magnet 14 having a width 15, a top portion 17, a bottom portion 18, and a retainer ring 16. The ring magnet 14 exerts uniform attractive forces about the circumference of ball roller 12. Therefore, the ball roller 12 is biased toward a center on an axis A. The roller 12, having a greater diameter than the width 15 of the ring magnet, extends outwardly from the top portion 17 and the bottom portion 18 of the ring magnet 14.

Figure 2:
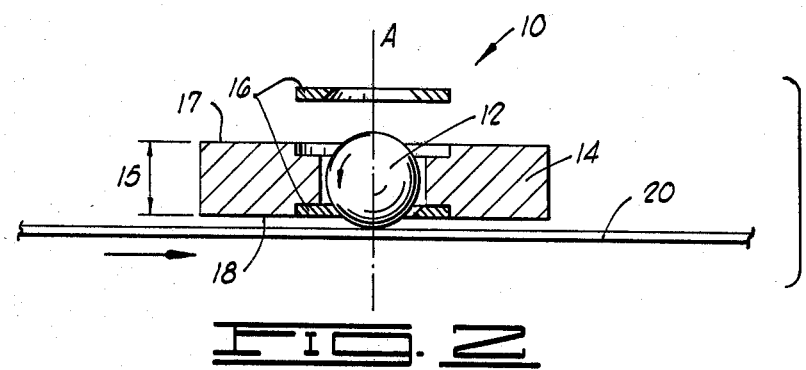
FIG. 2 is a cross-sectional view of the apparatus.

FIG. 2 shows a cross-sectional view of the apparatus 10. The ball roller 12 is captured by the magnetic field of the ring magnet 14. Ball roller 12 is prevented from being dislodged from the field by the retainer rings 16. The ball roller 12 is biased against the moving medium 20 by the magnetic field acting along axis A. The magnetic field resists displacement of the ball roller 12, but not rotation of the ball roller. Therefore, the ball roller 12 rotates freely during the transporting of the medium 20.

Figure 3:
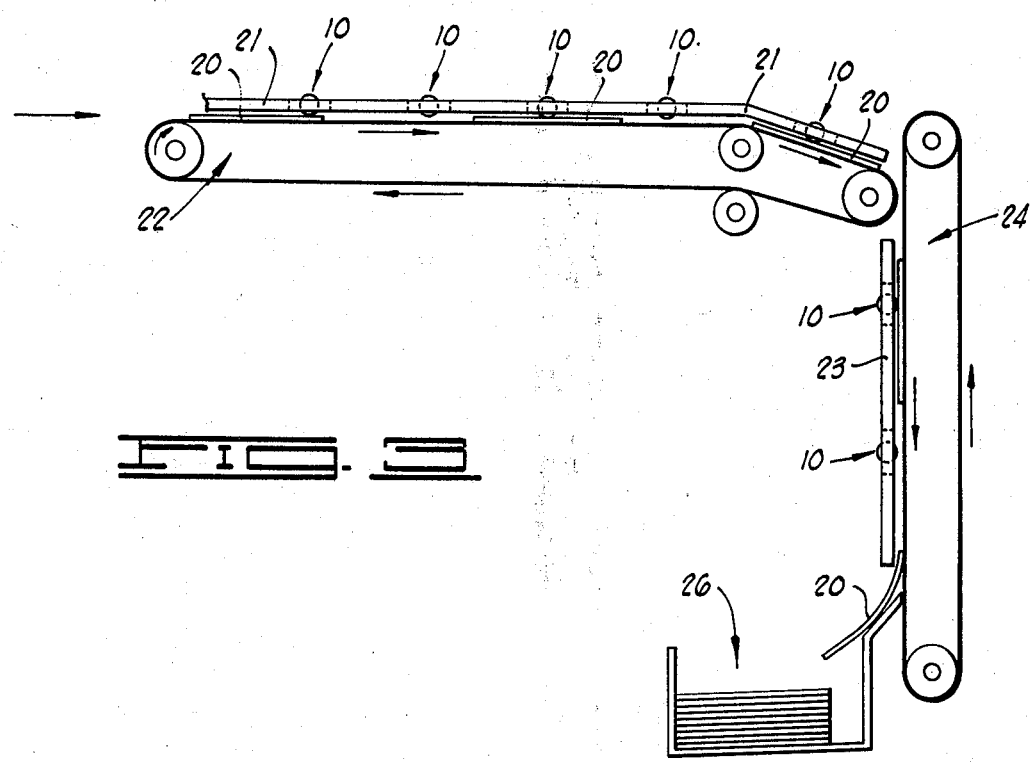
FIG. 3 is a side view of the apparatus in media moving equipment.

FIG. 3 illustrates one use of the subject invention in a media transport. In this illustration, the ball roller apparatus 10 is used to provide a force on the medium 20 being transported on a continuous horizontal conveyor belt 22 and a continuous vertical conveyor belt 24. The apparatuses 10 are shown mounted in a housing 21 in a horizontal plane. At the end of the conveyor belt 22, an apparatus 10 is shown mounted at an angle to the horizontal plane.

The paper medium 20 is transferred to the conveyor 24 and deposited into a paper stacking tray 26. Along the conveyor 24, the apparatuses 10 are shown mounted to a housing 23 in a vertical plane.

Changes may be made in the construction and arrangement of the parts or elements of the preferred embodiment as disclosed herein without departing from the spirit or scope of the invention as defined in the following claims.

What is claimed is:

1. A magnetic ball retaining apparatus used as a pressure roller in a media transport, the apparatus comprising:
    a metal ball roller; and
    a ring magnet having an inner and outer circumferance, said ball roller being captured magnetically within the inner circumferance of said ring magnet, said ball roller having a diameter greater than the width of said magnet and extending outwardly therefrom and engaging the media as the media is transported thereby.

2. The apparatus as described in claim 1 further including a retainer ring attached to said ring magnet to prevent said ball roller from being dislodged from within the inner circumferance of said ring magnet.

* * * * *